United States Patent
Balfanz

(10) Patent No.: US 8,135,956 B2
(45) Date of Patent: Mar. 13, 2012

(54) SYSTEMS AND METHODS FOR LIGHTWEIGHT AUTHENTICATION

(75) Inventor: Dirk Balfanz, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 993 days.

(21) Appl. No.: 11/637,293

(22) Filed: Dec. 11, 2006

(65) Prior Publication Data

US 2008/0141361 A1 Jun. 12, 2008

(51) Int. Cl.
 *H04L 29/06* (2006.01)
 *G06F 21/00* (2006.01)

(52) U.S. Cl. .................... 713/186; 713/166; 713/183

(58) Field of Classification Search .................. None
 See application file for complete search history.

(56) References Cited

U.S. PATENT DOCUMENTS

| | | | | |
|---|---|---|---|---|
| 6,175,922 | B1* | 1/2001 | Wang | 713/182 |
| 6,857,021 | B1* | 2/2005 | Schuster et al. | 709/227 |
| 7,107,455 | B1* | 9/2006 | Merkin | 713/182 |
| 7,730,078 | B2* | 6/2010 | Schwabe et al. | 707/758 |
| 2002/0023957 | A1* | 2/2002 | Michaelis et al. | 235/454 |
| 2002/0140542 | A1* | 10/2002 | Prokoski et al. | 340/5.52 |
| 2004/0100377 | A1* | 5/2004 | Brackett et al. | 340/539.13 |
| 2004/0128500 | A1* | 7/2004 | Cihula et al. | 713/155 |
| 2004/0232219 | A1* | 11/2004 | Fowler | 235/380 |
| 2005/0105734 | A1* | 5/2005 | Buer et al. | 380/270 |
| 2005/0222873 | A1* | 10/2005 | Nephin et al. | 705/2 |
| 2005/0223222 | A1* | 10/2005 | Graves et al. | 713/165 |
| 2006/0138210 | A1* | 6/2006 | Parkos et al. | 235/375 |
| 2006/0236373 | A1* | 10/2006 | Graves et al. | 726/3 |
| 2006/0253456 | A1* | 11/2006 | Pacholec et al. | 707/10 |
| 2010/0008551 | A9* | 1/2010 | Schiller et al. | 382/119 |

OTHER PUBLICATIONS

Dirk Balfanz, "Pen-based Authentication" Dec. 11, 2006.

* cited by examiner

*Primary Examiner* — Nathan Flynn
*Assistant Examiner* — Trang Doan
(74) *Attorney, Agent, or Firm* — Shun Yao; Park, Vaughan, Fleming & Dowler LLP

(57) ABSTRACT

Techniques are provided for the lightweight authentication of a user to an application, a computer or other device. An interaction element such as a stylus, a pen or marker is uniquely identified. The interactive element is associated with a user. The interaction element provides a means for interacting with the application. The proximity of the identification element within the interaction element during data entry operations to the authentication sensor signals the controlled application that the user has been authenticated.

23 Claims, 9 Drawing Sheets

FIG. 3
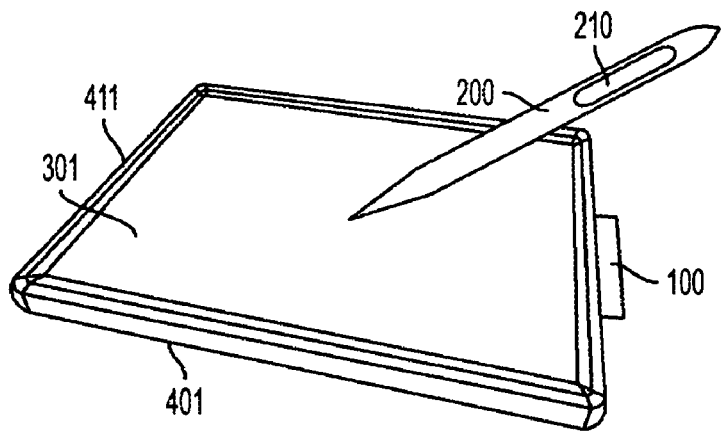
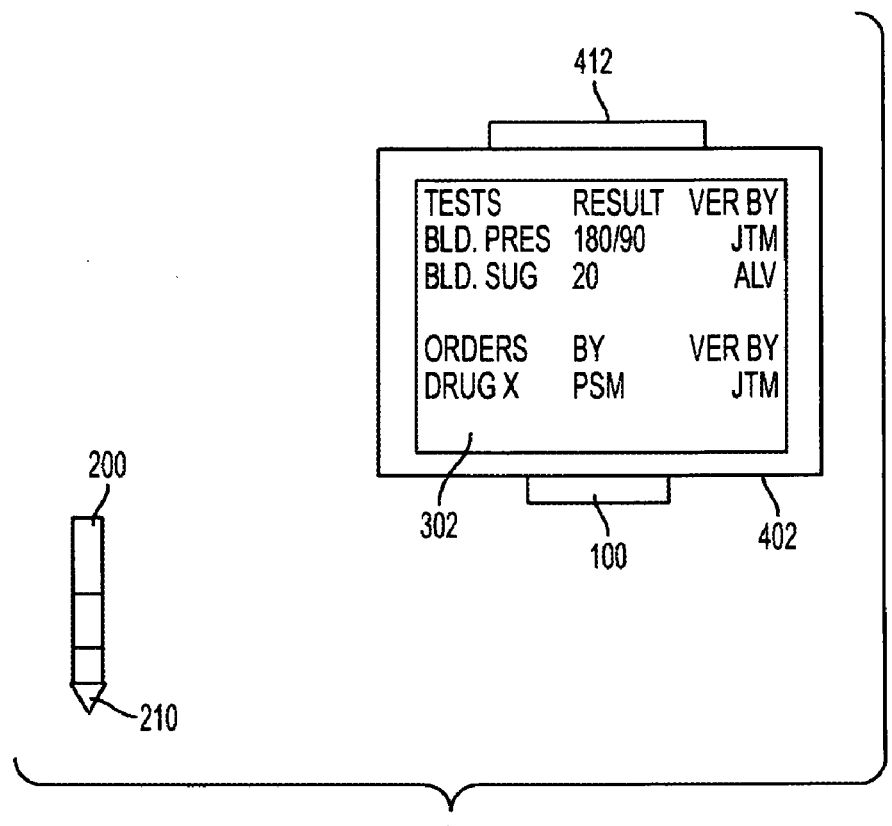
FIG. 4

FIG. 9
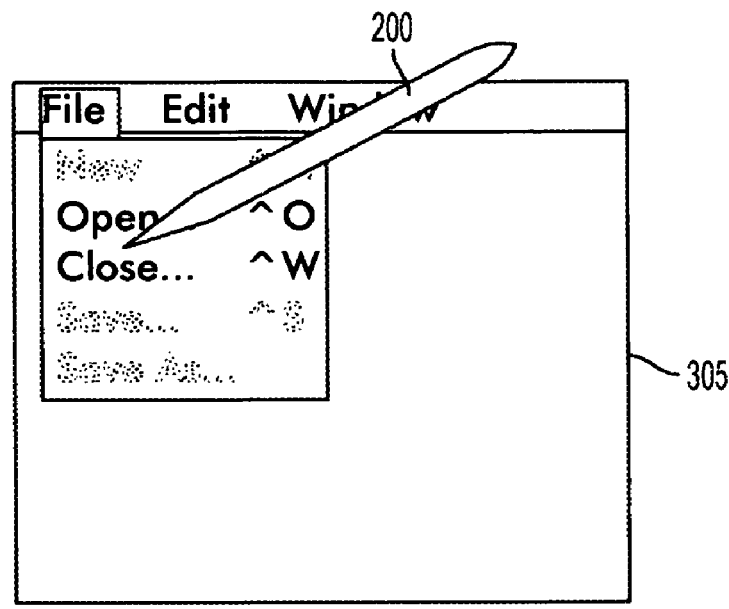
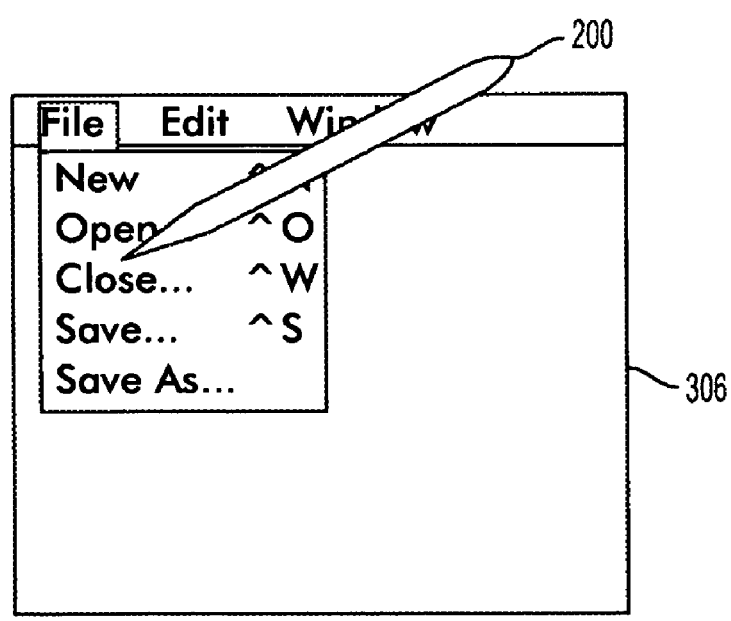
FIG. 10

SYSTEMS AND METHODS FOR LIGHTWEIGHT AUTHENTICATION

BACKGROUND OF THE INVENTION

1. Field of Invention

This invention relates to authentication.

2. Description of Related Art

Conventional security systems add steps or procedures to information retrieval or other tasks. These additional steps re-direct the user's attention from the primary task to secondary authentication tasks. The re-direction of attention tends to interrupt the user and reduces the user's efficiency in performing the primary task. Moreover, difficult and/or time consuming authentication steps reduce the likelihood that a user will actually log-in and then log-out of the controlled system after a task is completed. Instead, users tend to cluster transactions together for processing during a single authenticated session. Users faced with this type of authentication overhead are likely to leave sessions open which only serves to reduce the security of the system Thus, light-weight systems and methods of authentication would be useful.

SUMMARY

The systems and methods according to this invention provide for the lightweight authentication of a user to an application, a computer or other device. An interaction element such as a stylus, a pen or marker is uniquely identified. The interactive element is associated with a user. The interaction element provides a means for interacting with the application. The proximity of an identification element embedded within the interaction element during data entry operations to an authentication sensor is used to signal controlled applications that the user has been authenticated.

BRIEF DESCRIPTION OF THE DRAWINGS

FIG. 3 shows an exemplary system for light-weight authentication according to this invention;

FIG. 4 shows an exemplary user interface for a controlled application according to this invention;

FIG. 9 shows a first exemplary dynamically contextualized user interface according to this invention;

FIG. 10 shows a second exemplary dynamically contextualized user interface according to this invention.

DETAILED DESCRIPTION OF EXEMPLARY EMBODIMENTS

Figure 1:
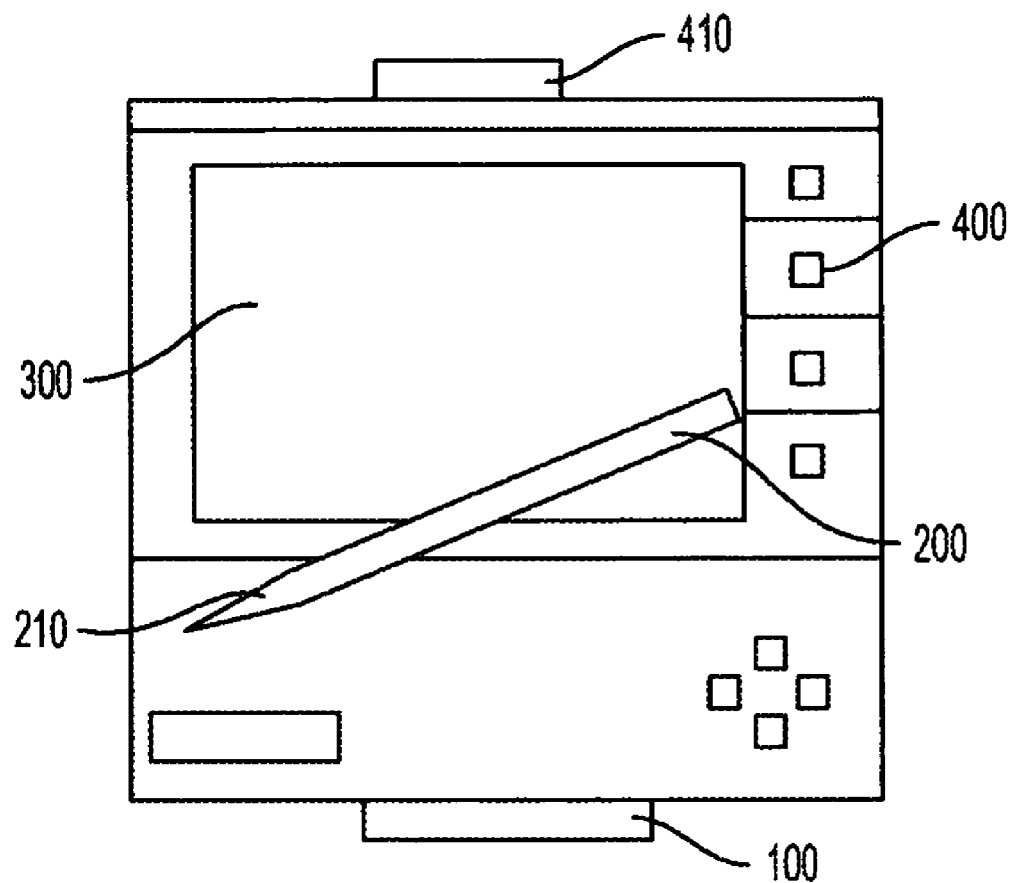
FIG. 1 shows an overview of an exemplary embedded system for light-weight authentication according to this invention.

FIG. 1 shows an overview of an exemplary embedded system for light-weight authentication 100 according to this invention. The system for light-weight authentication 100 is embedded within a tablet personal computer 400 and is associated with an interactive element 200 and an authentication sensor 410. The authentication sensor 410 is responsive to an identification element 210 associated and/or embedded within the interaction element 200.

In one exemplary embodiment according to this invention, each user of the application and/or tablet personal computer 400 is associated with a different interaction element 200. The interaction element 200 may be a stylus capable of serving as a conventional writing instrument, a stylus for writing with digital inks or the like. In other embodiments, the interaction element 200 is a pen, a pencil, a marker or other element or device that facilitates interaction with the controlled application or device. The interaction element 200 is associated with an identification element 210. The identification element 210 uniquely identifies the interaction element 200 within the system for light-weight authentication 100. The identification element 210 may be embedded within the device using Radio Frequency Identification (RFID) chips, near field communication devices, blue tooth communication devices and/or various other types of authentication systems.

In some embodiments, the tablet personal computer 400 executes controlled applications and/or provides access to controlled applications running on other devices. The controlled applications may include, but are not limited to operating systems, application programs, device drivers or the like. Each user is associated with a uniquely identified interaction element 200, providing a light-weight method of authenticating the user to a controlled application through the system for lightweight authentication 100.

For example, in one embodiment, a user "J. T. Doe" is associated with a uniquely identifiable pen-based interaction element. When the pen associated with the user is held within the authentication field of the authentication sensor 410, the identification element 210 is read. An association between the identification element and a user stored and/or retrieved by the system for lightweight authentication 100 is used to infer the identity of the user. The system for lightweight authentication 100 signals an authentication of the user to the controlled application running on the tablet personal computer 400. In some exemplary embodiments, the field associated with the authentication sensor 410 is adjusted by varying the transmission power or sensitivity of the authentication sensor. The authentication sensor 410 embedded within the tablet personal computer 400 and the identification element 210 embedded within the interaction device 200 may be based on bluetooth transmitter/receiver devices, near field communication devices, RFID devices and/or any other known or later developed systems capable of contextually authenticating the interaction element 210 to a controlled application. It should be apparent that in various embodiments according to this invention, the identification element 210 may be active or passive. That is, the identification element 210 may actively transmit information to the authentication sensor 410 or may be passively sensed by the authentication sensor 410 without departing from the spirit or scope of this invention.

In some exemplary embodiments according to this invention, the controlled application is also sensitive to a status or authority level associated with the user initiating the interaction. For example, in an exemplary medical records environment, the presence of a treating physician's stylus within the field of the authentication sensor 410 is detected by the system for lightweight authentication 100 which signals that the user should be authenticated to a first authority level. The first authority level can be used to add, delete, lock, unlock or otherwise generate contextually relevant data entry fields based on the first authority level. Orders for drugs or procedures are dynamically enabled or disabled based on the authority level of the user. In some environments, the presence of a nurse practitioner's stylus within the field of the authentication sensor 410 provides a more limited range of authorized prescription, drug or procedure options based on the assigned authority level of the nurse practitioner. Authority level designations are also useful in appropriately constraining the use of protected information such as patient test results and the like.

Figure 2:
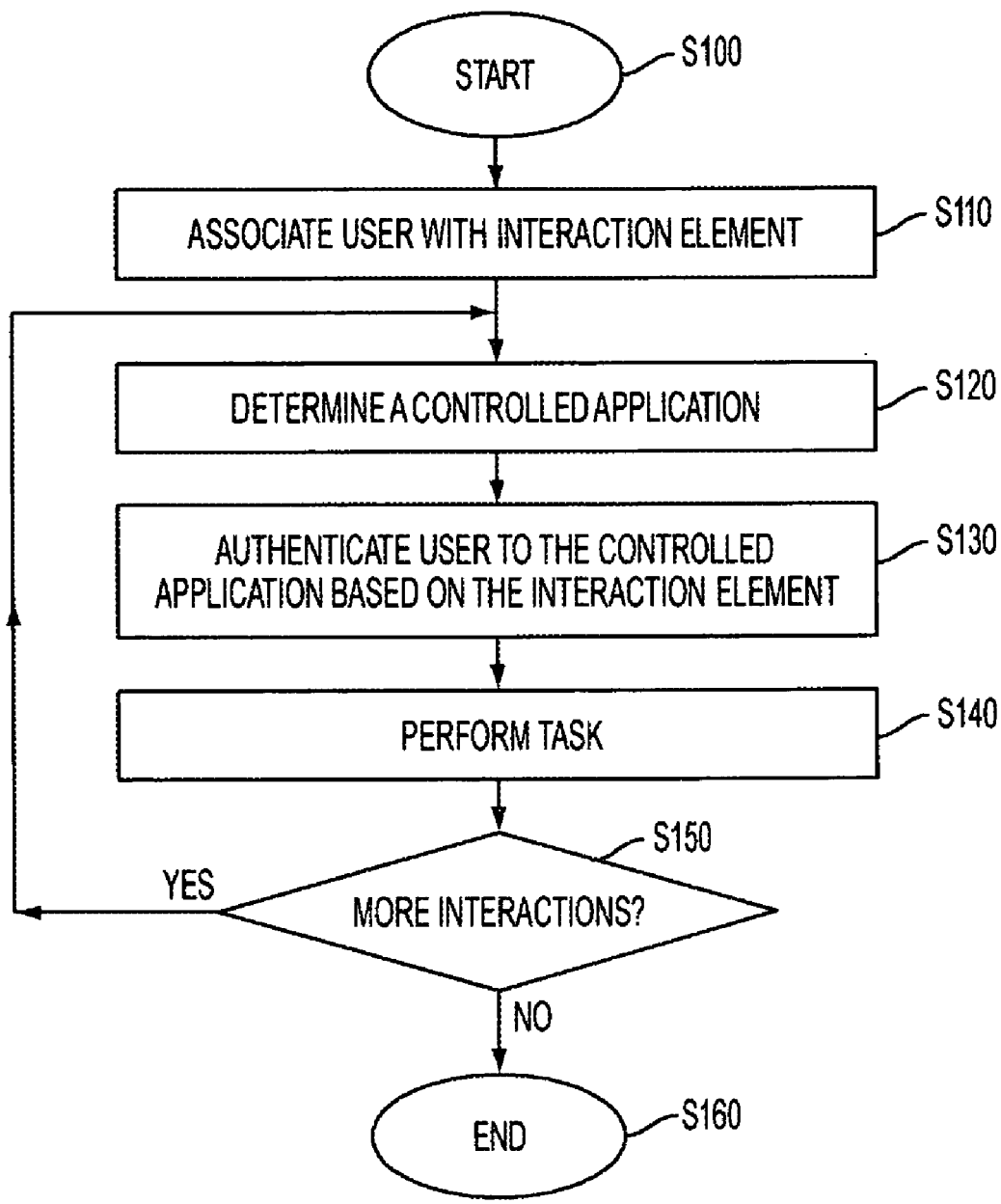
FIG. 2 is flowchart of an exemplary method of light-weight authentication according to this invention.

FIG. 2 is flowchart of an exemplary method of light-weight authentication according to this invention. The process begins at step S100 and immediately continues to step S110.

In step S110, users are associated with a unique interaction element or device. The interaction element may be a pen, a pencil, a marker or the like. In some exemplary embodiments, the interaction element contains an identification element such as an RFID, a blue-tooth or near-field communication device or the like. The presence of the interaction element within the field of an authentication sensor identifies and/or authenticates the user of the interaction element. In one embodiment, the user interface of the controlled system is dynamically determined based on a user's determined identity, authorization or other context element. The controlled systems or applications may include but are not limited to: the operating system of a computer, a database system, a medical device, and/or other devices, system or applications requiring user authentication and interaction. The interaction element is used to enter information and/or initiate interactions with the controlled application, system or device as well as to authenticate the user to the controlled application. After users have been associated with an interaction device, control continues to step S120.

The controlled application, system or device is determined in step S120. Controlled applications or systems include, but are not limited to computer operating systems, databases, order entry systems, medical records systems, medical device interfaces and/or various other known or later developed applications requiring authentication. After the controlled application has been determined, control continues to step S130.

In step S130, users are authenticated to the controlled system or application based on the proximity of the interaction device. For example, a specific doctor may be authenticated to the controlled application based on the identification element of a stylus associated with the doctor. If the identification element associated with the doctor and the interaction device is sensed within the field of the authentication sensor, the holder of the stylus is accorded an authority level that includes access rights within the medical records system based on the doctor's status and relationship to the patients. Thus, a treating physician may be given full access to add and or delete drug orders for a patient. In contrast, a consulting physician may be given only viewing access to a patient's records while a non-treating and non-consulting physician might be denied any access to the patient records.

In still other embodiments according to this invention, the controlled application reacts differently based on the identity of the user associated with the interaction device. For example, although both doctors and nurse practitioners may be permitted to enter orders for prescriptions and procedures, the presence of a nurse practitioner's stylus within a new order field may prompt the user to enter additional contextually relevant information not required when the stylus of a treating physician is used to enter the order for the prescription or procedure. In this way, best practice procedures are ubiquitously enabled within the environment. After the user is authenticated to the controlled application, control continues to step S140.

The requested task is performed on the controlled system, application or device in step S140. Thus, in one example, drug formularies or procedures are activated based on the authority level of the user and an order selected for the patient from the formulary.

After the requested task has been performed, a determination is made at step 150 whether the user continues interaction. If so, control jumps to step 120, where the controlled application for the next interaction is determined. If, at step 150, there is no further interaction with any controlled application, the process ends at step 160.

In some exemplary embodiments, a controlled application may be an application or software routine executing within a medical device or the like. In some environments, a user's arm or hand becomes an interaction element by the attachment of a watch, a ring or other identification element to the finger, wrist or arm of the user. An authentication sensor is mounted adjacent to the keyboard or input device of the controlled application or device. As the user's arm or hand enters the authentication field surrounding the keyboard, the user arm or digit type of interaction device is uniquely authenticated to the controlled application, system or device.

FIG. 3 shows an exemplary system for light-weight authentication according to this invention. Authentication element 210 previously associated with a user and/or authority level is embedded within the interaction device 200. An authentication sensor is sensitive to the identification element 210. The identification sensor 210 may be active or passive without departing from the spirit or scope of this invention.

As the embedded identification element 210 is placed within the field of the authentication sensor 411, the system for lightweight authentication 100 detects the user associated with the identification element 210 and authenticates the user to the computing device 401 or controlled application running on the computing device 401. In some embodiments a dynamically contextualized user interface 301 is generated based on the user and authority levels associated with the user as determined by the system for lightweight authentication 100.

FIG. 4 shows an exemplary user interface 302 for a controlled application according to this invention. The exemplary user interface 302 is comprised of groups of context-sensitive zones. The context-sensitive zones are dynamically updated with information based on the identity of the user and/or derived attributes associated with the user. Derived attributes may include a user's authority level, professional qualifications, certifications, affiliations or the like. The user interface is displayed on the tablet personal computer 402, a medical device, a monitor or other controlled device.

The authentication sensor 412 is sensitive to an identification element 210 embedded within the interaction element 200. Authentication of a user is based on the proximity of the identification element 210 embedded within the interaction element 200 to the authentication sensor 412 as detected by the system for lightweight authentication 100 which signals the controlled application or controlled device with the identity and authority level of the user. In some exemplary embodiments, the authentication determines access privileges to the information or to further transform or select information for display.

Figure 5:
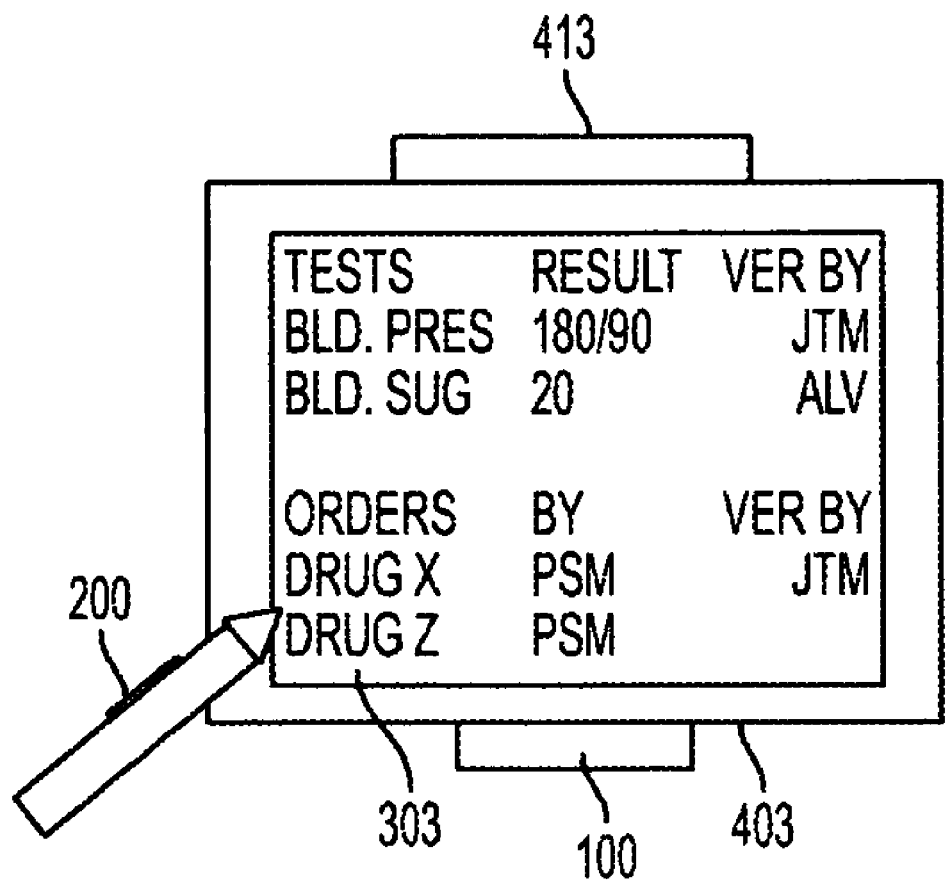
FIG. 5 shows a second exemplary user interface for a controlled application according to this invention.

FIG. 5 shows a second exemplary user interface 303 for a controlled application according to this invention. The user interface 303 for the controlled application is displayed on a tablet personal computer 405. An interaction device 200 with an embedded identification element (not shown) is placed within an authentication field generated by an active authentication sensor 413.

In one embodiment, the identification element 210 embedded within the interaction element 200 is associated with user "P. S. Smith". When the interaction element 200 is placed over the "ORDERS" section of the controlled application, the system for lightweight authentication 100 transmits the user id and authority level to the controlled application. A screen is then opened to allow doctor "P.S. Smith" to select authorized medications from a drop-down drug formulary. In various other exemplary embodiments according to this invention, the drug selections are contextually relevant to the prescribing physician, patient's condition, treatment location and/or other relevant factors. For example, if the attending physician is a dermatologist, the treatment location is the doctor's office, then the presented list of medications may be optionally limited to those medications typically prescribed by the doctor, medications consistent with the patients condition, insurance plan and/or any other relevant procedure or constraint. In some embodiments, the "ORDERS" record for the patient is then updated with relevant information about the prescribing physician and the prescription or order.

Figure 6:
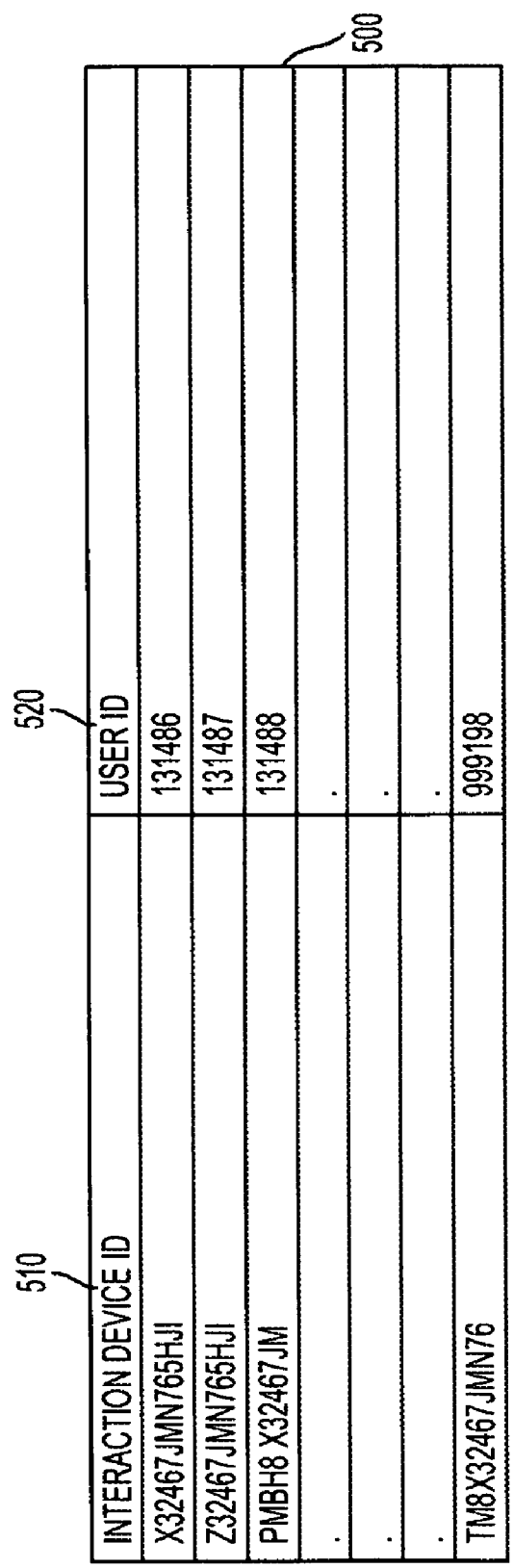
FIG. 6 is an exemplary data structure for storing interaction element identification information according to this invention.

FIG. 6 is an exemplary data structure for storing interaction element identification information 500 according to this invention. The exemplary data structure for storing interaction element identification information 500 is comprised of an interaction device id portion 510 and a user id portion 520.

The first row of the exemplary data structure for storing user-interaction element identification information 500 contains the value "X32467JMN765HJI" in the interaction device identifier portion 510 and the value "131486" in the user identifier portion 520.

The "X32467JMN765HJI" value in the interaction element identifier portion 510 uniquely identifies the interaction device within a system for light-weight authentication. The interaction device identifier value may be permanently encoded within the identification element of the interaction element and/or written into the interaction element at a later time.

The "131486" value in the user identifier portion 520 identifies the user identifier associated with the specified interaction element. In other exemplary embodiments, the user id may be a name, an account number and or any other known or later developed method of uniquely identifying the user to the system for light-weight authentication. Thus, the interaction element for user "131486" is known to the system and can be used to provide light-weight authentication for any controlled application, system or device.

The second row of the exemplary data structure for storing user-interaction device identification information 500 contains the value "Z32467JMN765HJI" in the interaction device identifier portion 510 and the value "131487" in the user identifier portion 520.

Thus, the user "131487" is associated with the interaction device "Z32467JMN765HJI" allowing controlled applications to provide light-weight authentication and facilitating the provision of contextually relevant information for a user associated with ID "13148" when the specified interaction element is used to interact with the controlled application, system or device.

The third row of the exemplary data structure for storing user-interaction device identification information 500 contains the value "PMBH8X32467JM" in the interaction device identifier portion 510 and the value "131488" in the user identifier portion 520.

This indicates that user "131488" is associated with the interaction device "PMBH8X32467JM" allowing controlled applications to provide light-weight authentication and facilitating the provision of contextually relevant information for a user associated with ID "131488" as the interaction element is used to interact with the controlled application, system or device.

The last row of the exemplary data structure for storing user-interaction device identification information 500 contains the value "TM8X324673MN76" in the interaction device identifier portion 510 and the value "999198" in the user identifier portion 520. These values indicate that user "999198" is associated with the interaction device "TM8X32467JMN76".

Figure 7:
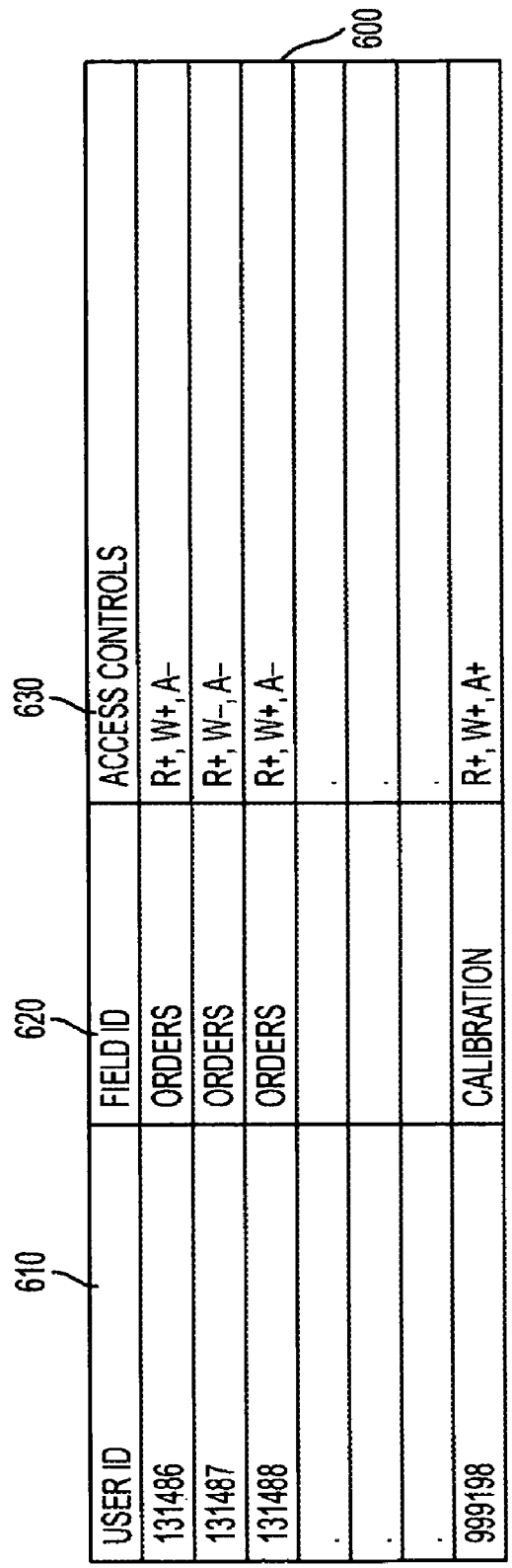
FIG. 7 is an exemplary data structure for storing access control information 600 according to this invention.

FIG. 7 is an exemplary data structure for storing access control information 600 according to this invention. The exemplary data structure for storing access control information 600 is comprised of a user id portion 610, a field id portion 620 and an access controls portion 630.

The first row of the data structure for storing user access control information 600 contains the value "131486" in the user identification portion 610, the value "Orders" in the field id portion 620 and the value "R+, W+, A−" in the access control portion 630.

The value "131486" in the user identification portion 610 identifies the user for whom the access control information is provided. The access control information is typically associated directly with a user and in-directly associated with the interaction device identifier. This facilitates the replacement of lost or stolen interaction devices. However, it will be apparent that the access control information may be directly associated with the interaction device identifier without departing from the spirit or scope of this invention.

The value "ORDERS" in the field identifier portion 620 specifies the field for which access is specified. That is, different fields may be associated with different access control levels. The value "R+, W+, A−" in the access control portion 620 specifies the type of operations that user "131486" can perform within the "ORDERS" field of the controlled application. The permissions are indicated using conventional "+", "−" notation. Thus, in the example, read access is enabled, write access is enabled and audit overwriting is disabled.

The second row of the exemplary data structure for storing user access control information contains the value "131487" in the user identifier portion 610, the value "ORDERS" in the field identifier portion 620 and the value "R+, W+, A−" in the access control portion 630. This indicates that although user "131487" is permitted view records, the user is not permitted to create new order records. For example, user "131487" may be a consulting physician and therefore un-authorized to prescribe medication and procedures for a patient. Thus, the write permission "W" is disabled as indicated by the "−" permissions status indicator. However, the read permission "R" is enabled to allow her to review patient records.

The third row of the exemplary data structure for storing user access control information contains the value "131488" in the user identifier portion 610, the value "ORDERS" in the field identifier portion 620 and the value "R+, W+, A−" in the access control portion 630. This indicates that user "131488" is permitted to view records as well as to create new order records. For example, the user "131488" may be a treating physician or nurse practitioner or other practitioner authorized to prescribe medication and procedures for a patient. Thus, the read and write permission "R+" and "W+" are enabled as indicated by the "+" permissions status indicator.

The last row of the exemplary data structure for storing user access control information contains the value "999198" in the user identifier portion 610, the value "CALIBRATION" in the field identifier portion 620 and the value "R+, W+, A+" in the access control portion 630. These values indicate that user "999198" is permitted to view records as well as to create new order records and the entry "A+" indicates the user is authorized to reset and/or disable the audit log. This may be required where the user is a technician responsible for servicing a controlled application or device.

Figure 8:
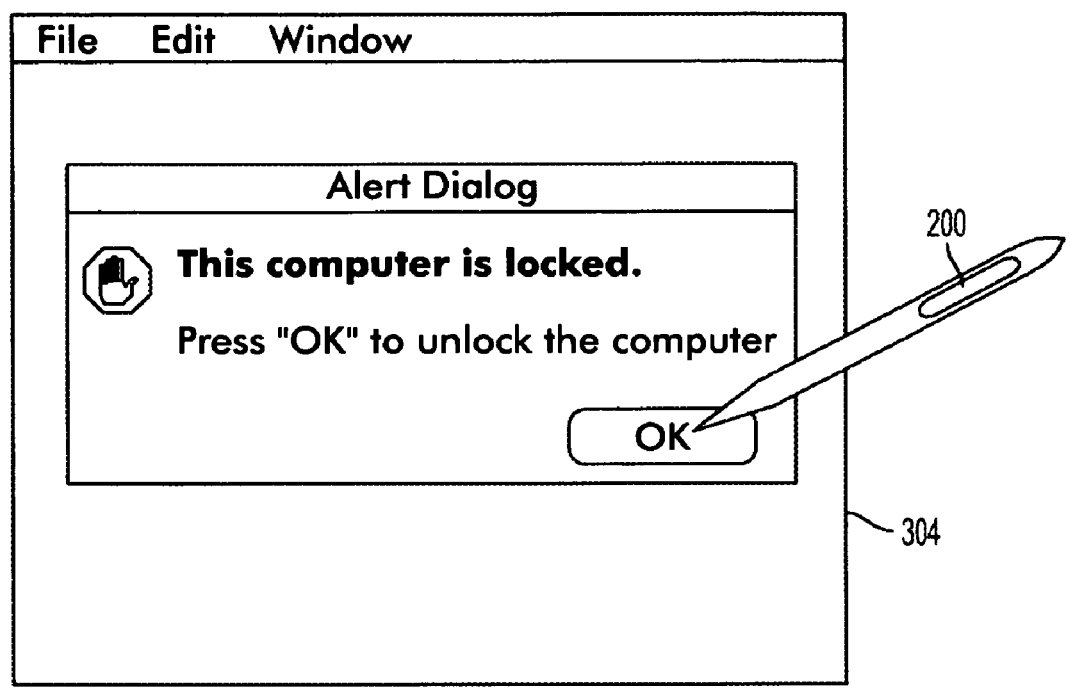
FIG. 8 shows an exemplary user interface according to this invention.

FIG. 8 shows an exemplary user interface 304 according to this invention. The user interface 304 contains an alert dialog box indicating that the computer is locked and inviting the user to press OK with the interaction device 200 to unlock the system. In various embodiments according to this invention, a light-weight authentication manager or routine is added to an operating system or application program. The light-weight authentication manager manages a transmitting/receiving device pair. The user is authenticated to the system when the interaction element 200 is placed on the screen to respond to the dialog box. The proximity of an identification element embedded within or associated with the interaction element 200 to an authentication sensor (not shown) is used to signal the identity of the user to the controlled application.

FIG. 9 shows a first exemplary dynamically contextualized user interface 305 according to this invention. The menus of the dynamically contextualized user interface 305 are sensitive to the authority level of the authenticated user. Thus, for the user associated the interaction device 200, only the "OPEN" and "CLOSE" operations under the "FILE" menu are enabled. It will be apparent that various rules, permissions access controls lists and/or various other authorization schemes or methods may also be used in the practice of this invention.

FIG. 10 shows a second exemplary dynamically contextualized user interface 306 according to this invention. In this example, the "NEW", "OPEN" "CLOSE" "SAVE" and "SAVE AS" operations are enabled. That is, the previously inactive operations "NEW", "SAVE" and "SAVE AS" are active for the user associated with interactive element 201.

Figure 11:
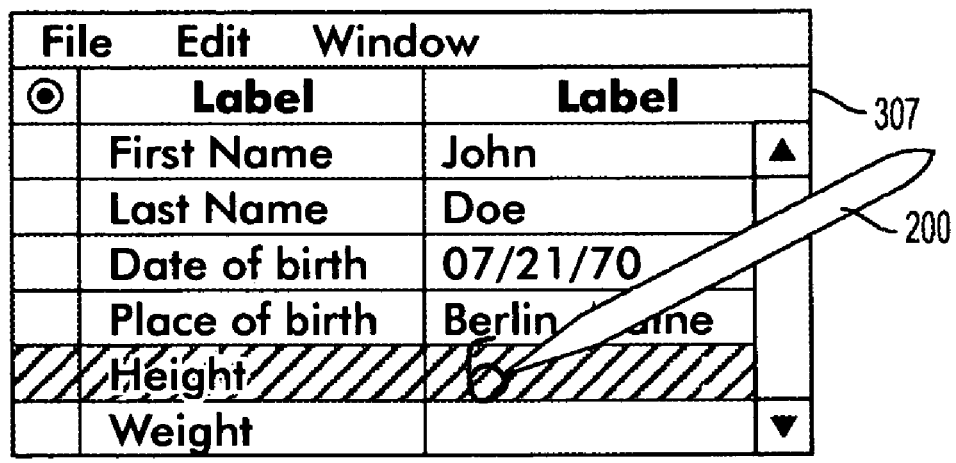
FIG. 11 shows a third exemplary dynamically contextualized user interface.

FIG. 11 shows a third exemplary dynamically contextualized user interface 307 according to this invention. A data entry grid is conditionally activated based on the authority level and/or identity of the user indicated by the interaction element 200. In one exemplary embodiment, the user draws the number "6" using digital ink in the height field for patient John Doe. The digital ink entry is transformed into the numeric value "6".

In the various embodiments of the system for light-weight authentication 400, each of the circuits of the system outlined above can be implemented as portions of a suitably programmed general-purpose computer. Alternatively, the system for light-weight authentication 400 outlined above can be implemented as physically distinct hardware circuits within an ASIC, or using a FPGA, a PDL, a PLA or a PAL, or using discrete logic elements or discrete circuit elements. The particular form each of the circuits of the system for light-weight authentication 400 outlined above will take is a design choice and will be obvious and predictable to those skilled in the art.

Moreover, the system for light-weight authentication 400 and/or each of the various circuits discussed above can each be implemented as software routines, managers or objects executing on a programmed general purpose computer, a special purpose computer, a microprocessor or the like. In this case, the system for light-weight authentication 400 and/or each of the various circuits discussed above can each be implemented as one or more routines embedded in the communications network, as a resource residing on a server, or the like. The system for light-weight authentication 400 and the various circuits discussed above can also be implemented by physically incorporating the system for light-weight authentication 400 into a software and/or hardware system, such as the hardware and software systems of a web server or a client device.

The memory of the system for light-weight authentication 400 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a writeable or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various embodiments, communication links can be used to connect the system for light-weight authentication to other systems. The communication links can each be any known or later developed device or system for connecting a communication device to the system for light-weight authentication 400, including a direct cable connection, a connection over a wide area network or a local area network, a connection over an intranet, a connection over the Internet, or a connection over any other distributed processing network or system. In general, the communication links can be any known or later developed connection system or structure usable to connect devices and facilitate communication.

Further, it should be appreciated that the communication links can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for lightweight authentication comprising:
a processor;
an interaction mechanism that interacts with an interaction device which is embedded with an identification element, wherein the interaction device is at least one of a stylus, a pen, a pencil, and a pointing device, and wherein the identification element identifies the interaction device and facilitates associating a medical practitioner with the interaction device;
a sensor that receives a communication from the identification element when the interaction device is in proximity;
an authentication mechanism that authenticates the medical practitioner to a controlled system or application based on the proximity of the interaction device; and
a controlling mechanism that grants a same access to a data item to at least two authenticated medical practitioners with different authorization levels, wherein the access to the data item requires additional contextual information from at least one of the authenticated medical practitioners with a lower authorization level based on the medical practitioner's identity associated with the interaction device.

2. The system of claim 1, in which the controlled system or application is at least one of: a software application and a hardware device.

3. The system of claim 1, in which the controlled system or application is at least one of: a business application and a medical application.

4. The system of claim 1, in which the access to sub-portions of the controlled system or application is based on a user authority associated with a user.

5. The system of claim 4, in which the user authority is comprised of access levels.

6. The system of claim 5, in which the access levels are associated with controls which are at least one of: read, write, delete, append, create and view.

7. The system of claim 1, in which the interaction device is associated with an identification element and the user is associated with a unique identification element.

8. The system of claim 1, in which an interaction device is associated with an identification element and the user is authenticated to the controlled system or application based on the identification element.

9. The system of claim 8, in which the controlled system or application determines a response based on the identification element sensed by the sensor.

10. The system of claim 9, in which the sensor creates an authentication field.

11. The system of claim 9, in which the sensor is based on at least one of: radio frequency identifiers, near field communication, Bluetooth communication, WiFi communication and infra-red communication.

12. A computer-implemented method for lightweight authentication, the method comprising:
associating an interaction device with an identification element, wherein the interaction device is at least one of a stylus, a pen, a pencil, and a pointing device, and wherein the identification element identifies the interaction device and facilitates associating a medical practitioner with the interaction device;
receiving a communication at a sensor from the identification element when the interaction device is in proximity;
authenticating the medical practitioner to a controlled system or application based on the proximity of the interaction device; and
granting a same access to a data item to at least two authenticated medical practitioners with different authorization levels, wherein the access to the data item requires additional contextual information from at least one of the authenticated medical practitioners with a lower authorization level based on the medical practitioner's identity associated with the interaction device.

13. The method of claim 12, in which the controlled system or application is at least one of: a software application and a hardware device.

14. The method of claim 12, in which the controlled system or application is at least one of: a business application and a medical application.

15. The method of claim 12, in which the access to sub-portions of the controlled system or application is based on a user authority associated with a user.

16. The method of claim 15, in which the user authority is comprised of access levels.

17. The method of claim 16, in which the access levels are associated with controls which are at least one of: read, write, delete, append, create and view.

18. The method of claim 12, in which the interaction device is associated with an identification element and the user is associated with a unique identification element.

19. The method of claim 12, in which an interaction device is associated with an identification element and the user is authenticated to the controlled system or application based on the identification element.

20. The method of claim 19, in which the controlled system or application determines a response based on the identification element sensed by the sensor.

21. The method of claim 20, in which the sensor creates an authentication field.

22. The method of claim 20, in which the sensor is based on at least one of: radio frequency identifiers, near field communication, Bluetooth communication, WiFi communication and infra-red communication.

23. A non-transitory computer-readable storage medium comprising computer-readable program code embodied on the computer-readable storage medium, the computer-readable program code useable to program a computer for lightweight authentication, comprising:
associating an interaction device with an identification element, wherein the interaction device is at least one of a stylus, a pen, a pencil, and a pointing device, and wherein the identification element identifies the interaction device and facilitates associating a medical practitioner with the interaction device;
receiving a communication at a sensor from the identification element when the interaction device is in proximity;
authenticating the medical practitioner to a controlled system or application based on the proximity of the interaction device; and
granting a same access to a data item to at least two authenticated medical practitioners with different authorization levels, wherein the access to the data item requires additional contextual information from at least one of the authenticated medical practitioners with a lower authorization level based on the medical practitioner's identity associated with the interaction device.

* * * * *